Patented Apr. 18, 1939

2,155,318

UNITED STATES PATENT OFFICE 2,155,318

PROCESSES FOR THE DEACIDIFICATION OF LIQUIDS, ESPECIALLY WATER

Otto Liebknecht, Neubabelsberg, near Berlin, Germany, assignor to The Permutit Company, New York, N. Y., a corporation of Delaware No Drawing. Application July 24, 1936, Serial No. 92,464. In Germany July 27, 1935

13 Claims. (Cl. 210—23)

In the purification of water for household and industrial purposes, especially for boiler feed purposes, numerous processes have been suggested, which rest partially on chemical precipitation or adsorption of substances dissolved in water, or which remove especially the hardness from the water by base exchange. In base exchange, another base is substituted for that originally present; there is no subtraction of solids. All these processes have the fault that the resultant waters contain more or less large quantities of alkali salts, usually sodium salts, which are formed by conversion in the different processes from the earth alkali salts, in other words from the hardness of the water. To this there are still in addition those alkali salt quantities which are contained in nearly all waters in addition to the hardness causing salts, and which are removed by none of the above mentioned processes.

Hard waters usually contain "permanent hardness" (caused by sulfates or chlorides) as well as "temporary" hardness (carbonate hardness).

By hydrogen exchange zeolites, the bases or cations of the carbonates can be readily removed, leaving $CO_2$ which can be readily removed from the water. But the cations of the sulfates and chlorides when removed leave free mineral acids, sulfuric and hydrochloric. In treating ordinary water containing both kinds of hardness, the effluent water contains free $CO_2$ derived from the carbonate hardness and free mineral acid derived from the sulphate or non-carbonate hardness. The free mineral acid imparts methyl orange acidity to the water, a pH substantially less than 7. While the free $CO_2$ can now be removed without difficulty, for instance, by aeration, evacuation, heating or the like, this is not the case with regard to the mineral acids, as they are either not volatile at all or, as a result of their dilution, even if they are volatile, cannot be expelled. Since however water containing mineral acids as such can be utilized only in the rarest cases, especially not for boiler feed purposes, one was compelled to neutralize the mineral acids again, or rather to arrange the exchange reaction in such a way that a neutralization of the mineral acids took place during the exchange reaction itself. In all these cases a quantity of salts at least corresponding to the sulphate hardness was now again added to the water. Removal of sulphuric acid can be effected by precipitating it with bases which form not easily soluble salts with it, or with salts of such bases the anion of which is easily removed, like, for instance, barium hydroxide or barium carbonate. But the procedure, particularly with the use of barium carbonate, is a comparatively slow and incomplete one. Besides, the very fine precipitate needs a fairly long period to settle and finally there are also dosing difficulties, as precisely equivalent amounts must be used, entirely disregarding the fact that in the use of barium carbonate, barium carbonate always enters the liquid also by trickling. Barium carbonate is not wholly insoluble. Finally, hydrochloric acid cannot be removed at all in this manner. My copending application Serial No. 10,127, filed March 8, 1935, discloses processes abstracting the bases of salts dissolved in water, leaving mineral acids in the water.

In accordance with the present invention, waters which are salt free or salt poor are obtained by a double treatment; the base being first exchanged for a hydrogen ion and then the acid water brought into contact with such substances that are capable of retaining the acids, without on their part giving off to the water objectionable constituents. As such substances the oxides or hydroxides of such metals that are capable of forming insoluble basic compounds, like, for instance, the oxides or hydroxides of iron, aluminum, zinc, tin, etc., which are physiologically harmless have proved especially desirable. In themselves other metal oxides or hydroxides as for instance the corresponding compounds of copper, lead and others can be used with the same or similar effects.

The process may be carried out in various ways. The acid water resulting from an abstraction of bases can be mixed with an excess of, for instance, iron hydroxide paste, which has been produced by precipitation with alkaline substances at an elevated temperature or cold from ferric salts, and separated by filtration in order to obtain a neutral water, which still contains only very small quantities of salt and is remarkably similar to distilled water. This similarity is even greater because by the desilicifying action of the iron hydroxide, $SiO_2$ is also nearly completely removed from the water.

Another form of carrying out the process may consist in drying the pressed and preferably washed hydroxides of the metals, in connection with which the drying is carried only to such an extent that not all the water of constitution is expelled. The resultant substances, which for instance still contain 10 per cent to 20 per cent water removable by ignition, are crushed to a suitable grain size and the acid water is percolated through a pervious bed of the granules.

The filtration can be carried out cold, as well as warm, but the effect seems to be better at a low temperature.

A further form of the process consists in letting the acid water itself flow over metals, preferably with large surface area, or in bringing it in contact with them in other ways, in connection with which, when a metal is involved which has two valences, like, for instance, iron, one must take care that the higher oxidation step is at least completed in the effluent water by suitable addition of air or other oxidation agents, for instance, permanganate or permanganic acid, pyrolusite or persulphuric acid and its salts and conversion products, like hydrogen peroxide or also ozone, chlorine, etc., or anodic oxidation. In other words, in this method of execution the formation of the oxides or hydroxides takes place from the metals themselves. In this connection one can apply all the measures which will serve to accelerate the formation of hydroxides. In place of the pure metals, metal alloys can be used, for instance, those of zinc and aluminum, or by using several metals which are mixed with each other, one can produce galvanic couples for instance within the metal filters, for instance, copper and iron.

One can also use naturally occurring substances, which have these properties, for instance, bauxite, pyrolusite or bog iron ore or also siderite. In using the last named, an after-treatment with oxidizing agents, as mentioned above, is necessary, in order to form tri-valent iron from the di-valent iron. If the free $CO_2$ is not previously removed, the ferrous carbonate is also attacked by it and ferrous iron from this source must also be converted into the ferric form by the oxidizing agent.

If the oxidation of the iron does not take place or takes place only very slowly or incompletely because of too high hydrogen ion concentration (about neutral point), the water is given a smaller hydrogen ion concentration by addition of very small quantities of alkali, in other words, is made slightly alkaline, whereupon then the oxidation, for instance, also with air takes place rapidly.

If stronger salt solutions are present like, for instance, in sea water, it is generally not possible to obtain a removal of salt with a single treatment with a hydrogen ion exchange material and one acid absorbent. In order to arrive at a satisfactory result in this connection, the solution must be passed through a system in which hydrogen exchange material and acid absorbent alternate so often, for instance three to ten times or more, that the desired result of partial or complete freedom from salt is achieved. In this connection the series in which the individual pairs of hydrogen exchange material and acid absorbents are arranged can be altered, so that the latter pairs may be first, etc.

In general it may be said that the regeneration of the hydrogen ion exchange material must usually be more frequent than that of the acid absorbents, when in using the latter one works with substances which are worth while regenerating in view of their high cost or in view of the effort required in their production.

As already mentioned above, in this treatment of the acid water not only a removal of the acid by binding, but also a removal of the $SiO_2$ by absorption takes place. The fact that in this treatment with metal oxides or hydroxides other impurities of the water, like humus substances, insofar as they have not been removed previously, are also removed, should be stressed particularly.

It is desirable to use a water for the ion exchange, from which the $SiO_2$ has been previously removed, for instance a water that has been treated with suitable magnesium compounds or metal oxides or hydroxides or gels. Likewise the water can be treated previous to the ion exchange with other softening agents which bring about a partial softening, while the residual hardness is then removed by ion exchange. In all these processes, however, care must be exercised that only as small a quantity as possible of alkali salts enter the water.

The process relates not only to water which contains hardness but also to waters which contain other salts, for instance, alkali salts, possibly besides the hardness; in other words, generally speaking to dilute salt solutions which contain salts of the mineral acids or other acids besides, for instance, carbonates or bicarbonates.

The regeneration of the exchange material may be effected with acids, while the metal compounds, insofar as the regeneration is worth while may be regenerated with alkaline solutions, for instance, ammonia, caustic soda, sodium carbonate, etc., whereby the basic compounds are reconverted into the hydroxides. The regeneration has the effect of charging the basic compounds with hydroxyl ions replacing the acid anions removed from the water.

For example, a water containing a total hardness of 187 parts per million as $C_2CO_3$ of which 135 p. p. m. was carbonate hardness and 52 p. p. m. non-carbonate hardness, besides so much alkali salt as is equivalent to the hardness of approximately 53 p. p. m. and in addition 16 p. p. m. $SiO_2$ was treated in accordance with the invention.

It first passed through a carbon containing base abstracting material, regenerated with hypochloric acid, and thereupon through a dried, finely granulated iron oxide gel. And in this connection two parts by volume of the base abstracting material and one part by volume of the iron oxide gel were used, through which 200 parts by volume of the water were passed at a velocity of 10 parts by volume in one hour. All of the water was completely neutral on leaving the last filler.

The first half of the water, i. e. 100 parts by volume, had an average composition of 15.5 p. p. m. $Na_2SO_4$ and 1.3 p. p. m. $SiO_2$, and the second half, i. e. also 100 parts by volume, had an average composition of 70 p. p. m. $Na_2SO_4$ and 5.2 p. p. m. $SiO_2$. All of the water was free from hardness.

The example shows that in the first half of the water nearly all of the salt contained as alkali salt in the raw water was removed, while in the second half the salt content corresponds to that of the alkali salts in the raw water.

Not only aqueous solutions can be subjected to this treatment but also solutions of substances which in themselves are inactive in the sense of ion exchange, like for instance sugar solutions, which are to be freed of the salt content of lime salts or alkali salts. As is shown, the crystallization of sugar is retarded considerably by these salts. This difficulty is eliminated by the above described process, since sugar solutions are obtained which are completely or nearly completely free of salt.

As will be noted, in the present invention, salines can be subtracted from water by a 2-step operation: the cation of the saline being taken up by a hydrogen zeolite leaving the anion in solution and this latter removed by contact with extensive surfaces of a metal oxide.

What is claimed is:—

1. The process for removing salts from industrial water, especially boiler feed water, which comprises filtering the saline water through a hydrogen exchange material and then filtering the acid filtrate through a metal oxide gel charged with hydroxyl ions by treatment of the gel with alkali.

2. A process of purifying hard water containing saline impurities which comprises first treating the water with a hydrogen exchange material exchanging saline cations in the water for hydrogen, thereby leaving free mineral acid in the water, and subsequently abstracting said acid from the water by treatment with an oxide adapted to retain said acid in insoluble form.

3. In the process of claim 2, abstracting free acid by contacting the acid water with a preformed metal oxide.

4. In the process of claim 2, abstracting free acid by passing the acid water through a granular bed of dried hydrated metal oxide gel.

5. In the process of claim 2, abstracting free acid by passing the acid water through a bed of hydrated ferric oxide granular dried gel.

6. A process of purifying water containing dissolved salts which comprises exchanging cations of the salts for hydrogen by contacting the water with a hydrogen-ion zeolite leaving in the water the anions of the salts as free acid and thereafter removing said free acid from the water by contacting it with extensive surfaces of granular dried metal oxide gel abstracting the acid.

7. In the process of claim 6, regenerating the hydrogen-ion zeolite for reuse by a dilute acid wash and regenerating the metal oxide gel for reuse by a dilute alkali wash.

8. In softening water containing permanent hardness by aid of a hydrogen zeolite abstracting bases therefrom and leaving the water containing residual mineral acid, a process of converting the product into neutral water low in its content of solutes which comprises removing said acid from the water by contact with a metallic oxide gel in granular form fixing said mineral acid in an insoluble condition.

9. A process according to claim 8 wherein mineral acid is abstracted by passing the water through a pervious bed of dried granular partially dehydrated aluminum hydoxide in gel form.

10. A process of purifying hard water containing saline impurities which comprises first treating the water with a hydrogen exchange material exchanging saline cations in the water for hydrogen, thereby leaving free mineral acid in the water, and subsequently abstracting said acid from the water by passing the acid water through a bed of dried granular hydrated ferric oxide gel.

11. A process of purifying hard water containing saline impurities which comprises first treating the water with a hydrogen exchange material exchanging saline cations in the water for hydrogen, thereby leaving free mineral acid in the water, and subsequently abstracting said acid from the water by passing the acid water through a pervious bed of dried granular partially dehydrated aluminum hydoxide in gel form.

12. The process for removing salts from industrial water, especially boiler feed water, which comprises filtering the saline water through a base-exchanger containing hydrogen ions and then filtering the acid filtrate through a granular iron oxide gel charged with hydroxyl ions by treatment of the gel with alkali.

13. The process for removing salts from industrial water, especially boiler feed water, which comprises filtering the saline water through a carbonaceous hydrogen zeolite, and then filtering the acid filtrate through a granular iron oxide gel charged with hydroxyl ions by treatment of the gel with alkali.

OTTO LIEBKNECHT.

---

CERTIFICATE OF CORRECTION.

Patent No. 2,155,318. April 18, 1939.

OTTO LIEBKNECHT.

It is hereby certified that error appears in the printed specification of the above numbered patent requiring correction as follows: Page 2, second column, line 13, for "quanttiy" read quantity; line 33, for "$C_2CO_3$" read $CaCO_3$; line 41-42, for "hypochloric" read hydrochloric; line 49, for "filler" read filter; and that the said Letters Patent should be read with this correction therein that the same may conform to the record of the case in the Patent Office.

Signed and sealed this 6th day of June, A. D. 1939.

Henry Van Arsdale (Seal) Acting Commissioner of Patents.